Patented Mar. 9, 1937

2,073,426

UNITED STATES PATENT OFFICE 2,073,426

APPARATUS FOR AUTOMATICALLY CONTROLLING AND MATCHING ELECTRIC GENERATORS

Erick Pearson, Chicago, Ill.

Application November 12, 1935, Serial No. 49,377

26 Claims. (Cl. 290—4)

My invention relates to improvements in apparatus for automatically matching the frequencies of generators and the distribution system to which the generator is to be connected, and particularly to a generator controlled through a governor having a limit device for determining the maximum power input into the prime mover therefor.

An object of the invention resides in providing apparatus adapted to operate in conjunction with the limit device of the governor for the prime mover.

Another object of the invention resides in providing apparatus adapted to be disconnected from the governor limit device upon the generator being synchronized and connected to the distribution line.

A still further object of the invention resides in providing means for connecting the speed matching apparatus with the governor limit device when the apparatus is to be put into action.

A feature of the invention resides in providing a member adapted to be disposed in the path of movement of the limit device and in further providing means responsive to differences in the frequencies of the distribution system and generator for adjusting said device to vary the limit at which the limiting device is arrested.

An object of the invention resides in providing means for withdrawing said device disposed in the path of movement of the limiting device from such position to permit the limiting device to travel independently.

Another object of the invention resides in constructing said device disposed in the path of movement of the limiting device of the governor in the form of a dog and in providing a magnet for withdrawing said dog from the path of movement of said limiting device when the generator becomes synchronized with the distribution system.

Other objects of the invention reside in the novel combination of parts and in the details of construction hereinafter illustrated and/or described.

Figure 1:
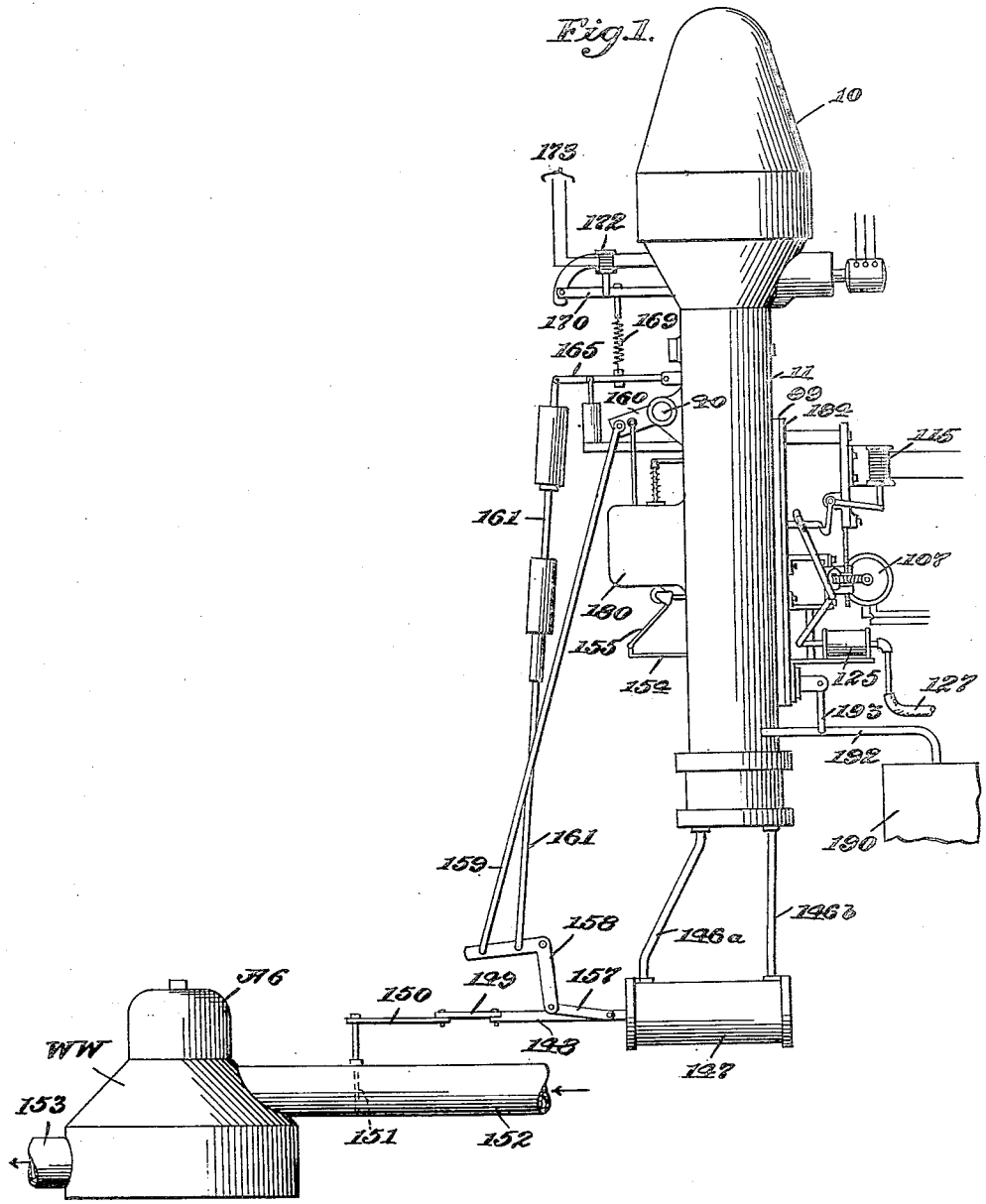
Figure 1 is a conventional diagram showing the connection of a governor to a water wheel, in accordance with this invention.

For the purpose of illustrating the application of the invention, a portion of a governor, such as is used for controlling the speed of water wheels, has been shown which is indicated in its entirety at 10. Inasmuch as such governors are well known in the art, only certain portions of the same have been illustrated in detail. The governor 10 includes a case 11 to which the various operating mechanisms of the same are attached. In the upper portion of this case is formed a bracket 12 which supports a vertically extending tube 13. The tube 13 is held in place within said bracket by means of a set screw 14 and forms a bearing for a sleeve 15 which is rotatably mounted thereon. The sleeve 15 carries the usual fly balls 16 which operate in opposition to springs 17 to reciprocate a head 18 slidable along the upper portion of the sleeve 15. The head 18 is mounted upon the end of a spindle 19 which extends below the lowermost end of the tube 13. The sleeve 15 is driven through a bevel gear 20 rigidly attached thereto, which meshes with a bevel pinion 21 fast on an operating shaft 22. The shaft 22 is journaled in a bearing 23 in case 11 and may be driven from the generator or from the prime mover connected therewith, or may be driven from a synchronous motor 22m or other similar device operating in synchronous relation with the generator. The governor operates in the usual manner to reciprocate the spindle 19 longitudinally as the speed of the shaft 22 varies.

In alignment with the spindle 19 is a second spindle 24 which is disposed below the spindle 19 and which is slidably mounted in a sleeve 25. The sleeve 25 is mounted for reciprocation in bearings 26 formed in a bracket 27 in the cage 11. The end of the spindle 24 is connected to a lever 28, whereby fluid controlled valves are manipulated to open and close the gate controlling the flow of water to the water wheel or other prime mover, as will be described hereinafter. The upper end of the spindle 24 has attached to it a flanged disc 29 against which the spindle 19 bears and which forms a seat for one end of a compression coil spring 30. The other end of this coil spring is seated in the end of a cylindrical member 31 which is rotatably mounted within a cup 32. The cup 32 is internally threaded to screw upon the threaded end 33 of the sleeve 25 and is adapted, upon rotation, to move toward or from the flanged disc 29 to vary the pressure upon the spring 30. For the purpose of rotating the cup 32, the same is provided with spiralled gear teeth 34 forming an elongated worm wheel. These gear teeth mesh with a worm 35 rigidly attached to a shaft 36. The shaft 36 is journaled in bearings 37 in the case 11 and is provided with a gear 38 by means of which the same may be driven. It can readily be comprehended that the pressure exerted by the spring 30 may be varied by rotating the shaft 36 through the gear 38 mounted thereon or through a handle 38a attached to the end thereof.

Figure 2:
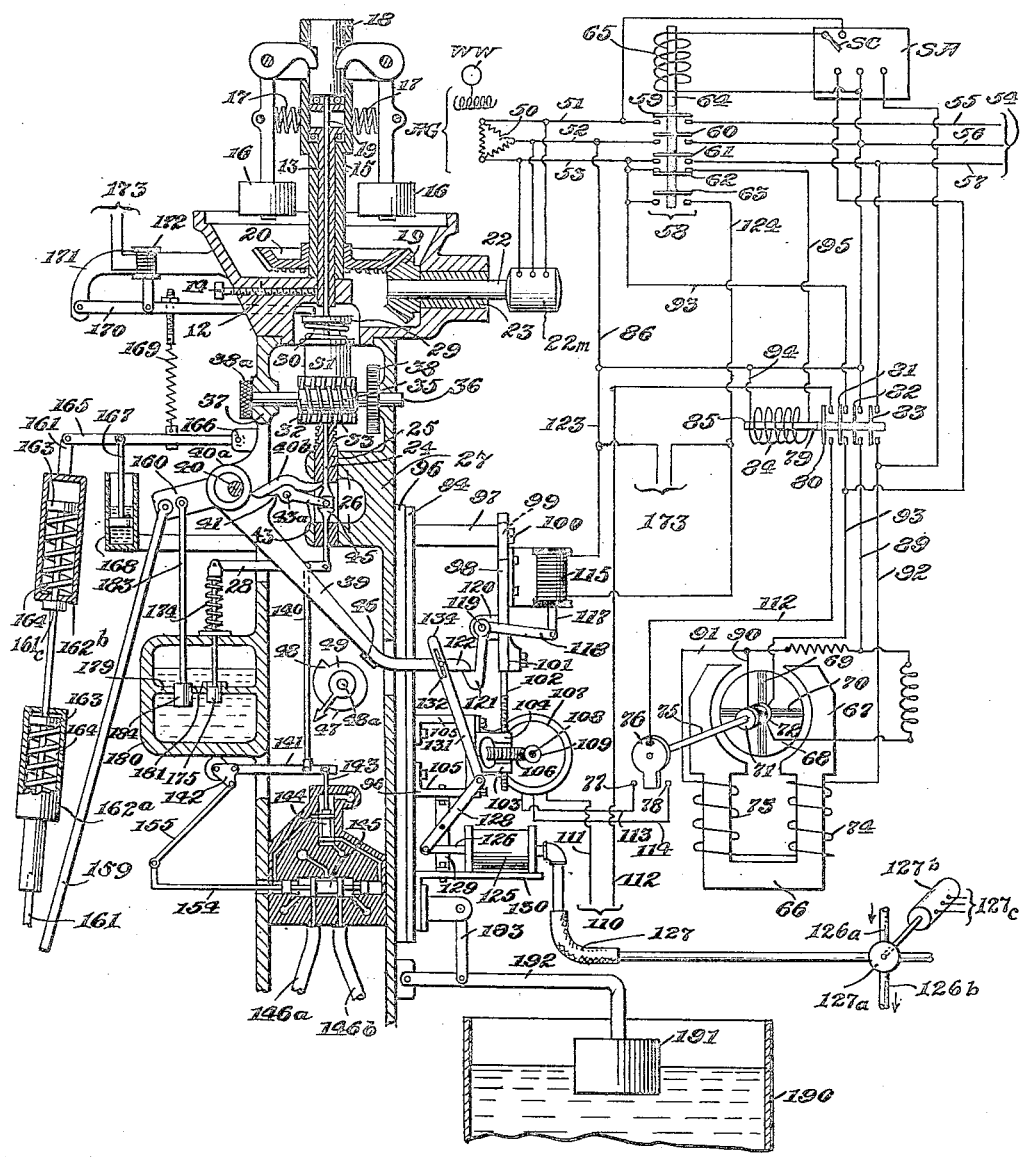
Figure 2 is a similar diagrammatic view, on a larger scale of parts, and indicating the electrical, mechanical and fluid pressure connections of the several parts.

The lever 28 is connected by a link 140 to a traveling lever 141 which is pivotally mounted at one end on a crank piece 142 which is pivoted to the fixed frame of the governor structure. The traveling lever 141 is connected to the stem 143 of a piston valve 144 which operates as a servo-motor for controlling the supply and discharge of fluid from the main control valve 145. This is conventionally shown on Fig. 2 of the drawings in conjunction with the conduits for the delivery and withdrawal of fluid, and so devised and arranged that the movements of the link 140 cause valve movements for controlling the delivery of fluid under pressure to and from the conduits 146a, 146b which (Fig. 1) are connected to opposite ends of the hydraulic cylinder 147 for moving the water controlling gate. In the conventional form shown in Fig. 1, this is accomplished by moving a piston within the cylinder 147 and thus actuating the piston rod 148 which is connected by the link 149 with a crank 150 positively attached for moving the gate 151 located in a pen-stock 152 of the prime mover power plant, in order to control the flow of water to the water wheel WW from which it is discharged through the outfall 153. It will be understood that the water wheel WW drives the alternating generator AG in this illustrative form.

The main control valve 145 has an externally projecting valve rod 154 which is connected by a link 155 with the crank 142 to establish a partial compensation in and by the movement of the servo-motor valve 144 to assure a proper operation of the parts as will be described hereinafter.

In the illustrative form shown, further, the piston rod 148 of the hydraulic gate-moving cylinder 147 is connected by a link 157 with the crank lever 158 which is pivoted on the fixed structure and is connected by a link 159 with the arm 160 fixed to the shaft 40. This crank lever 158 is also connected at the same arm at a point nearer the pivotal axis of the crank lever with a resiliently extensible link 161. This link is in several sections and includes the housings 162a, 162b, each of which has a spring follower 163 and a spring 164 therein. The upper end of the link 161 is connected to an end of the lever 165 whose other end is connected by a pivot 166 to the fixed frame. Intermediate its length the lever is connected to the plunger 167 of a dash-pot device 168, and also is connected to an adjustable tension spring 169. The upper end of this tension spring 169 is engaged with the governor biasing lever 170 which is pivotally mounted on a bracket 171 at one end, and at the other end extends into the governor casing 11 and bears upon the upper surface of the flanged disk 29. The downward tension upon lever 170 by spring 169 may be overcome by the action of the solenoid 172 energized through the conductor wires 173 when taking load upon the generator, these wires being connected to the conductors 123, 124, and thus establishing a shunt circuit for solenoid 172 in parallel with the load-taking solenoid 115.

The operation of this speed correcting structure is to compensate for the characteristic of the governor of having a speed change for different loads. It operates for automatically adjusting the speed control at different loads so as to maintain a substantially constant and predetermined speed of the prime mover during different load conditions. This is particularly valuable where several generating plants may be individually connectable to a distribution line, and it is desirable that each plant, when operating separately, shall maintain a predetermined frequency. When the gate 151 is moved by the piston rod 148, the link 161 is actuated so that the lower housing 162a is moved. The two pistons 163 are connected together with the spring 164 of housing 162a normally holding the lower piston 163 in its uppermost position. The upper housing 162b is fixedly connected by the upper end of link 161 to lever 165. Thus when the rod 161 is moved upward at its lower end, the stop collar 161c maintains engagement with the upper housing 162b. The movement of lever 165 is delayed by the dash-pot 168. Thereafter the lower spring 163 is compressed as the housing 162a moves upward relative to the lower piston 163, and then the link gradually extends again as the dash-pot 168 yields. Finally, the link 161 extends itself to the full length.

When the link 161 is pulled downward, a similar action occurs, as the dash-pot delays the lever 165; with the result that the collar 161c is pulled away from the upper housing 162b and the spring 164 therein is compressed, and the link again finally attains a full extension at a rate controlled by the dash-pot 168.

Thus, the spring 165 is actuated at a lesser rate than the rate of movement of the gate, so that an automatic limitation is opposed to tendency for hunting, as mechanical inertia and overthrow of various parts is damped out. Hence the sudden changing of loading does not result in speed changes or frequency changes; and the system tends to operate at a steady frequency regardless of loading or changes of loading.

As usual, the lever 28 is biased for upward motion at its left-hand end (Fig. 2) by a spring 174, and is connected to a piston 175 which fits closely in a cylinder provided in the web wall 179 of the control housing 180 connected to the governor casing. The web wall 179 also has an aperture 181 therein for the slow balancing of pressures between its compartments. The arm 160 of shaft 40 also is connected to a stem 183 of a piston 184 which, similarly to the piston 175, is located in a cylinder formed in the web wall 179. The piston 183 is usually larger in cross-section than the piston 175. These parts operate to effect a control of the gate in opening and closing under control of the governor, to prevent hunting. Thus, when a quick speed change occurs, the speed spindle 24 is moved quickly by the fly balls, which operate through the general train and valves to cause a compensating movement at the gate. As the gate is moved, the link 159 moves, and therewith the piston 184; so that pressure differentials are created in the upper and lower compartments of the housing 180 to produce an opposite and compensating movement of piston 173 which changes the fulcrum point of lever 28 and thus modifies the position of link 140. Thus a lesser instantaneous movement of the control rod 140 occurs than the related movement of the speed spindle 24. Due to the presence of the leak 181, however, the piston 175 more slowly responds to the action of spring 174; so that ultimately the movement of link 140 becomes fully equivalent to the movement of the speed spindle 24.

Further, these parts operate in association with the eccentric shaft 40 and arm 39 under the general governor control for determining and compensating the gate movement.

In these drawings, the generator line is indicated by the numeral 50, this line comprising the busses 51, 52 and 53. The generator AG is indicated as an alternating current generator connected for energizing the line 50, and being driven by the prime mover WW. Likewise, the distribution line is indicated at 54 which comprises busses 55, 56 and 57. Inasmuch as any suitable generators and prime movers may be employed for energizing these lines, the same have only been illustrated diagrammatically in the drawings. The line 50 is normally disconnected from the line 54 and is adapted to be connected thereto through a main line switch 58. This line switch includes five contactors 59, 60, 61, 62 and 63 simultaneously operable through a single operating member, as for example, a plunger 64 adapted to be moved through a solenoid 65. The contactors 59, 60 and 61 respectively connect the buss 51 with the buss 55, the buss 52 with the buss 56, and the buss 53 with the buss 57.

For limiting the opening of the gate controlling the flow of water to the water wheel, the limit arm 39 is employed which is mounted upon the eccentric shaft 40. This arm is formed with a lug 41 on one side thereof which is adapted to engage a finger 42 formed on a lever 43. Lever 43 is pivoted at 43a to the case 11. A fork 44 formed on the other end of said lever engages between two collars on spindle 24 whereby movement of said spindle is imparted to the lever 43. The free end of the arm 39 is formed with a shoe 46 which rests upon a spiral cam 47. Cam 47 is pivoted to the case 11 at 48a and may be manually operated. This cam is constructed to cause the governor to completely close the gate controlling the flow of water to the water wheel when the shoe 46 rests upon the highest portion 48 thereof and to cause the governor to completely open the gate when said shoe rests upon the lowest portion 49 thereof.

For the purpose of controlling the mechanism operating in conjunction with the limit arm 39, I employ a motor indicated in its entirety at 66, which is in the nature of a synchroscope. This motor comprises a field core 67 and a rotor 68 rotatable relative thereto. The rotor 68 is provided with windings 69 and 70 which are connected to slip rings 71 and 72. The field core 67 is provided with windings 73 and 74 which are connected in series with one another. A shaft 75 rotatably supports the rotor 68 and has mounted upon the same a contact finger 76. The contact finger 76 may be frictionally driven through frictional engagement with the shaft 75 or any other suitable structure rotated thereby and may have its rotational movement arrested by engagement with either of two fixed contacts 77 and 78. When the shaft 75 rotates in a counterclockwise direction, as viewed in Fig. 1, finger 76 contacts with contact 78 and so continues to contact during the rotation of said shaft in the same direction. Upon the rotation of shaft 75 in the opposite direction, the finger 76 contacts with the contact 77 and continues to so contact during the continued rotation of said shaft in the same direction. Finger 76 is hence in contact with one of the contacts 77 or 78, depending upon the direction of rotation of shaft 75.

The motor 66 is energized both from the line 50 and from the line 54. For the purpose of connecting said motor with said lines, a circuit closer 79 is employed which is provided with four contactors 80, 81, 82 and 83 which all move simultaneously through a single operating member, as for example, a plunger 85 adapted to be moved by a solenoid 84. The contacts 80, 81, 82 and 83 are normally open and, upon actuation by the solenoid 84, serve to close the circuits controlled thereby. The following circuits are closed by said circuit closer. The busses 56 and 52 of the lines 54 and 50 are connected together through leads 86, 87 and 88 which in turn are connected to a common lead 89. The lead 89 is connected to the slip ring 71 of motor 66 through a conductor 90 and is further connected through a conductor 91 with the free end of the field coil 73. The contactor 82 of circuit closer 79 serves to complete the circuit through the lead 89 which is normally open. A lead 92 is connected from the buss 57 of the distribution line to the field coil 74 of motor 66. This lead is normally open and is adapted to be closed through the contactor 83 of circuit closer 79. In a similar manner, a lead 93 is connected to the buss 53 of the generator line and to the slip ring 72 of motor 66. The circuit through this lead is normally open and may be closed through the contactor 81 of circuit closer 79. By means of these circuits, the rotor windings of the motor 66 are adapted to be energized from the distribution line 54 and the field windings of said motor to be energized from the generator line 50 upon closure of the circuit closer 79.

Due to the energizing of the relatively movable windings of the motor 66 from two independent sources of electric current, said motor is caused to rotate and operate in much the same manner as an ordinary synchroscope, rotating in one direction when the frequency of the current in the generator line is greater than that in the distribution line; and rotating in the opposite direction when the frequency of the current in the generator line is less than that in the distribution line. The speed of rotation of the shaft 75 of motor 66 depends upon the difference in frequency between the currents in the generator line and distribution line, and the said shaft comes to rest when the two frequencies are equal.

For operating the circuit closer 79, energy is derived from the generator line 50 through a circuit comprising leads 94 and 95, of which the lead 94 is connected to the buss 52 of the generator line through the lead 87, and of which lead 95 is connected to the buss 53 of said generator line through the lead 93. The leads 94 and 95 are directly connected to the solenoid 84 of the circuit closer 79. The circuit through the solenoid 84 is normally closed through the contactor 62 of the main line switch 58 which is connected to the lead 95. When the generator is brought up to speed to deliver sufficient current to energize the solenoid 84, the circuit closer 79 is operated to close the various contactors 80, 81, 82 and 83, which energizes the motor 66 and sets the same in operation.

In conjunction with the limit arm of lever 39 of the governor 10, a control mechanism is employed which is mounted on a slideway 96 of the governor casing 11 for vertical movement under control of means responsive to liquid level, such as the water level prevailing in the mill pond supplying the pen-stock 152. For this purpose, a chamber 190 is illustratively employed for containing a column of liquid for supporting the float 191 which is mounted on a lever 192 pivoted to the fixed frame and connected by a link 193 with the general sliding structure 194. On this sliding structure 194 is a bracket 97 opposite the end of which may be adjusted the slide 98. This slide has a slot 99 through which extends a screw 100 engaged in the end of bracket 97 for preventing disassembly of the parts. The other end of the slide 98 is formed with a boss 101 which has attached to it a screw 102. This screw is slidably mounted in two bearings 103 and 104 which are connected together and supported on a base 105 carried by the case 11 of governor 10. Between the two bearings 103 and 104 is disposed a worm wheel 106 which is internally threaded to screw upon the screw 102. By rotating the worm wheel 106, the screw 102 may be caused to raise and lower so as to slide the slide 98 relative to the bracket 97.

For rotating the worm wheel 106, a motor 107 may be employed, which is provided with the usual armature shaft 108. A worm 109 mounted upon the armature shaft 108 meshes with the worm wheel 106 and serves to rotate said worm to raise and lower the screw 102. The motor 107 may be attached to the base 105 in any suitable manner and may be energized from the line 54 or from any suitable source of energy not illustrated. For this purpose, a line 110 has been shown which comprises leads 111 and 112. The lead 111 is directly connected to the motor 107, while the lead 112 is broken and adapted to be closed by the contactor 80 of the circuit closer 79 when said circuit closer is operated by the solenoid 86. The lead 112 is electrically connected with the contact finger 76 on shaft 75 through any suitable means. The motor 107 is provided with two leads 113 and 114 adapted to operate the motor in either direction. These leads are directly connected to the contacts 77 and 78 previously referred to. Upon closing the circuit closer 79, as previously brought out, shaft 75 is caused to rotate in one direction or the other depending upon the difference in frequency of the currents in the generator line and in the distribution line. As soon as such rotation occurs, contact between the finger 76 and one of the contacts 77 or 78 is made, closing the circuit through the motor 107 which sets said motor into operation. Assuming that the shaft 75 is rotated in a clockwise direction, finger 76 would be caused to contact with the contact 77. This would complete the circuit from lead 111 through motor 107, through lead 113 to contact 77, through the finger 76 to lead 112, said lead being closed through the contactor 80. The motor 107 would then travel in one direction. Upon the reversal of movement of shaft 75, finger 76 would make contact with the contact 78 closing the motor circuit through the lead 114 and causing the motor to rotate in the opposite direction. In this manner the screw 102 can be raised or lowered, depending upon the direction of rotation of shaft 75.

The slide 98 carries an electromagnet 115 which is provided with a base 116 secured to said slide. A plunger 117 is adapted to be attracted by said solenoid. This plunger is pivotally connected to a bell crank 118 which in turn is journaled on a pintle 119 mounted in a supporting bracket 120 attached to the slide 98. The bell crank 118 is formed with a dog or catch 121 at the free end thereof which is adapted to engage a finger 122 on the extreme end of the limit arm 39. When said dog is in engagement with finger 42, the shoe 46 is out of engagement with the cam 47 thereby altering the maximum gate opening which would otherwise be determined by said cam. The solenoid 115 is connected through a lead 123 with the buss 52 of line 50 through the lead 86. This solenoid is further connected through a lead 124 with the buss 53 of said line through the lead 93. Lead 124 is normally broken and may be closed through the contactor 63 of the line switch 58 previously referred to. Prior to the closing of the line switch 58, the plunger 117 is free and the dog 121 is held into engagement with the end of the finger 122 through the weight of the bell crank 118 and plunger 117. As soon as the line switch 58 is closed, the circuit is completed through the lead 93, lead 124, solenoid 115, lead 123 and lead 86 back to the buss 53, thereby energizing said solenoid. Upon the solenoid 115 being energized, plunger 117 is drawn into the said solenoid, operating bell crank 118 and disengaging the dog 121 from the finger 122. This releases the arm 39 which drops through gravity until the shoe 46 thereof rests upon the cam 47. When the parts are so disposed, the control mechanism 96 is inoperative and completely disconnected from the limit arm 39, permitting the limit device of the governor to operate in the usual and customary manner.

For starting the invention, I employ a cylinder 125 having the usual piston therein adapted to operate a piston rod 126. The cylinder 125 is mounted upon a shelf 130 secured to the case 11 of the governor 10. A pipe 127 may be connected to the cylinder 125 and serves to furnish the same with a fluid under pressure. Upon subjecting the cylinder 125 to fluid under pressure from conduit 126a, the piston 126 may be moved outwardly and by applying suction from conduit 126b to the fluid within the cylinder 125, said piston rod may be moved in the opposite direction. Inasmuch as the means for applying fluid under pressure to the cylinder 125 do not form any particular feature of this invention, the same have not been shown or described in detail, though it can readily be comprehended that any suitable construction may be employed and that an electrically operated valve 127a with a motor 127b selectively energized through remote control conductors 127c, such as is now commonly known in the art may be utilized to control the movement of the piston rod 126. The piston rod 126 is pivotally connected to one end of a lever 128 which is pivoted to a support 129 carried by the base 105 and the shelf 130. The other end of the lever 128 has pivotally connected to it a toggle link 131 which is formed with a slot 132 at the free end thereof. A pin 134 secured to the finger 122 is slidable within the slot 132 and serves to guide the movement of the upper end of the toggle link 131. The slot 132 is of such length and is so situated with respect to the case 11 that when the lever 128 is in the position shown in the drawings, the limit arm 39 is free to move from the portion 48 of cam 47 to the portion 49 thereof without interference. When the toggle link 131 is straightened out by the movement of the piston rod 126 inwardly into the cylinder 125, the pin 134 is engaged by the lower end of the slot 132 which elevates the arm 39 sufficiently to bring the shoe 46 out of engagement with the cam 47 an amount sufficient to completely close the gate controlling the flow of water to the water wheel. This shuts down the prime mover and generator, rendering all of the mechanism inoperative and leaving the generator completely disconnected from the distribution line.

The operation of the invention is as follows:

The slide 194 and the parts supported thereby are positioned in accordance with the liquid level prevailing at the float 191, and thus the arm 39 is given an initial positioning tending automatically to compensate for changes in the water head, in this illustrated form, upon the water wheel. It will be noted that this occurs without any modification or change of the relationship of the dog 121 with respect to the lower end 122 of the arm 39. Upon subjecting the cylinder 125 to fluid under pressure from the pipe 127, lever 128 is oscillated and the toggle link 131 moved to its position shown in the drawings, releasing the arm 39. This causes said arm to descend until the finger 122 thereof rests upon the dog 121. Upon dropping the arm 39, the gate opens to start the prime mover and the generator is brought into operation. As soon as the generator comes up to voltage a circuit is completed from the buss 53 of the generator line 50 through contactor 62, lead 95, solenoid 84 of the circuit closer 79, lead 94, lead 87, and lead 86, back to the buss 52 of said line. Due to the fact that the main line switch 58 is normally in the position shown in the drawings, the contactor 62 is normally closed and, as stated, when the voltage of the generator comes up, the solenoid 84 is energized and the circuit closer 79 closed. This completes circuits through all of the contactors 80, 81, 82 and 83. Upon closing the circuit closer 79, the motor 66 is energized from both the distribution line and the generator line as previously brought out, and where differences in frequency between the currents in the generator line and distribution line occur, said motor rotates in one direction or the other as the case may be. The rotation of the shaft 75 of motor 66 causes the finger 76 to contact with either of the contacts 77 and 78 completing a circuit through the motor 107 which includes the contactor 80 thereby energizing said motor and turning the worm wheel 106. This raises or lowers the slide 98 and at the same time swinging arm 39 until the proper gate opening has been procured to bring the generator into synchronism with the distribution line. When the current in the generator line is in synchronism with that of the distribution line, a synchronizing apparatus SA is rendered operable to close a switch SC and thus a circuit designated at 158a which includes the solenoid 65 of the line switch 58. This closes the line switch and cuts in the generator. The closing of the line switch 58 also breaks the circuit through the contactor 62 which releases the circuit closer 79 and deprives the motor 107 and motor 66 of current. At the same time, a circuit is established through the contactor 63 which includes the lead 124, solenoid 115, lead 123, and lead 86 and is connected to the buss 52 and 53. Upon closure of this circuit, the plunger 117 of solenoid 115 is retracted and the dog 121 disengaged from the finger 122 of the limit arm 39. As long as the generator is connected in the line, the dog 121 remains disengaged, permitting the arm 39 to function in its normal manner without interference from the operating mechanism of my invention. When the generator is operating, my mechanism is virtually disconnected from the operating parts of the governor so that the same may function in the normal manner.

During the operation of the system, it will be noted that the rise or fall of water level operates automatically by reason of the slowing or speeding of the governor to accomplish a correction in the speed of the alternator by changing the position of opening of the gate 151 in the usual way. At the same time, during the operation of the alternator, also, the float 191 responds to the changes of water level or head and thus moves the dog 121 to a new position, at which it is capable (upon a new starting operation) to bring the alternator to a no load condition of synchronism with the network in the form illustrated.

Changes of the gate 151 in accordance with the load on the alternator AG, or in accordance with changes of the water head, are accompanied by a movement of the crank lever 158, and therewith through the compound link 161 for varying the tension of the spring 169. The dash-pot 168 operates to delay the movement of the lever 165 whereby to avoid a sudden release of pressure exerted by lever 170 upon the plate 29 at so fast a rate that the governor fly balls 16 suddenly move outward and tend to effect a rapid change in the structure for moving the gate. Such rapid changes are apt to cause "hunting" effects, and by providing the dash-pot 168, and in particular by providing the lever 170 with the spring load 169 thereon (this spring load being responsive to the change of position of the gate itself), I am enabled to establish a compensation for maintaining the desired frequency of the alternator under change of load and without undesirable hunting effects. When it is desired to give a sudden impetus in the system, however, this can be attained by energizing the wires 173 and thereafter the solenoid 172 to lift the lever 170 and thus reduce or eliminate its effect upon the plate 29.

Further, as the load changes, the effect of the cam 40a connected to the arm 160 in moving the lever 40b and therewith acting upon the sliding sleeve 25 is utilized to change the setting of the sleeve 25 to avoid hunting. As this occurs, however, it will be noted that the spring 169 is simultaneously being tensioned or released in consonance therewith to attain a proper progressive control of the system.

When it is desired to disconnect the generator, the pressure of the fluid in the cylinder 125 is reduced, causing the toggle link 131 to straighten out and to elevate the lever 39 sufficiently to completely close the gate controlling the flow of water to the water wheel. When this happens, the voltage of the generator drops and the energy for maintaining the line switch 58 closed, which may be derived from the generator circuit, is cut off, causing the main line switch to open and disconnect the generator line from the distribution line. When the generator is to be connected again, it will be found that the position of the worm 106 and slide 98 relative to the slide 194 is exactly the same as when the generator was last cut in, so that the gate is usually opened exactly the same amount as it was previously opened when the generator current was in synchronism with the distribution line current. With head water and other conditions practically constant from one time to the next, the generator in most cases is cut in almost instantaneously and very quickly when the conditions differ slightly. In this manner less time is used and less adjustment of the apparatus required.

The slide 194 is operated by the float 191, preferably in proportion to the effect of the change of head upon the generator operation at no load, in such a manner that the dog 121 is being maintained at a proper position for quickly bringing the generator to synchronism at no load soon after the solenoid 125 is energized, regardless of the changes of water level which may have occurred since the last operation. Thus the system becomes operative for quick paralleling either with substantially constant head water conditions or with head water conditions which fluctuate during the intervals from one starting to the next.

The advantages of my invention are manifest. My apparatus operates in conjunction with the limit device of the governor and functions in a simple and efficient manner to bring the generator to synchronism with the distribution line in a minimum length of time. The apparatus is entirely disconnected from the limit device when the generator has been cut in, permitting the limit device to function in its normal manner. The device is fully automatic and may be operated from remote control if desired.

Changes in the specific form of the invention as herein described may be made within the scope of what is claimed without departing from the spirit of my invention.

I claim:

1. In combination, an alternating current distribution system, a generator adapted to supply electric power thereto, a prime mover for said generator, a governor for said prime mover including a movable member movable in opposite directions to increase and decrease the power input to said prime mover, a movable limit device for limiting the movement of said movable member, and means responsive to differences in the frequencies of the distribution system and generator for terminating the movement of said limit device.

2. In combination, an alternating current distribution system, a generator adapted to supply electric power thereto, a prime mover for said generator, a governor for said prime mover, means for limiting the opening of said governor including a movable member movable in opposite directions to increase and decrease the power input to said prime mover, means affecting the movement of said movable member, means responsive to differences in the frequencies of the distribution system and generator for operating said means for affecting the movement of said movable member, and means for rendering said means for affecting the movement of said movable member inoperative upon said generator becoming synchronized with said distribution system to cause the governor to function in normal manner.

3. In combination, an alternating current distribution system, a generator adapted to supply electric power thereto, a prime mover for said generator, a governor for said prime mover including a movable member movable in opposite directions to increase and decrease the power input to said prime mover, a movable limit device for limiting the movement of said movable member, an adjustable stop adapted to be moved into the path of movement of said movable limit device for arresting the movement thereof, and means responsive to differences in the frequencies of the distribution system and generator for adjusting said stop.

4. In combination, an alternating current distribution system, a generator adapted to supply electric power thereto, a prime mover for said generator, a governor for said prime mover including a movable member movable in opposite directions to increase and decrease the power input to said prime mover, a movable limit device for limiting the movement of said movable member, an adjustable stop adapted to be moved into the path of movement of said movable limit device for arresting the movement thereof, means responsive to differences in frequencies of the distribution system and generator for adjusting said stop, and means for withdrawing said stop from the path of movement of said limit device upon the generator becoming synchronized with said distribution system.

5. In combination, an alternating current distribution system, a generator adapted to supply electric power thereto, a prime mover for said generator, a governor for said prime mover including means movable in opposite directions to increase and decrease the power input to said prime mover, a movable limit device for limiting the movement of said movable means, a movable member disposed in the path of movement of said limit device, and means responsive to differences in frequencies of the distribution system and generator for moving said movable member.

6. In combination, an alternating current distribution system, a generator adapted to supply electric power thereto, a prime mover for said generator, a governor for said prime mover including means movable in opposite directions to increase and decrease the power input to said prime mover, a movable limit device for limiting the movement of said movable means, a movable member disposed in the path of movement of said limit device, means responsive to differences in frequencies of the distribution system and generator for moving said movable member, and means independent of said movable member for moving said limit device to a position causing the cutting off of the power input to said generator.

7. In combination, a generator, a prime mover for said generator, control means for controlling the rate of delivery of energy to said prime mover, said control means including a member movable in accordance with the rate of delivery of the energy, means for moving said member to cause the energy to be delivered at different rates, two limit devices for limiting the movement of said movable member, and means for rendering one of said limit devices ineffective.

8. In combination, an alternating current distribution system, a generator adapted to supply electric power thereto, a prime mover for the generator, control means for controlling the rate of delivery of energy to said prime mover, said control means including a member movable in accordance with the rate of delivery of the energy, means for moving said member to cause the energy to be delivered at different rates, two limit devices therefor, means for retaining one of said limit devices at a position to deliver energy at a rate to operate the prime mover at substantially synchronous speed, the other limit device being capable of being set at a position to deliver energy at a rate to operate the prime mover under load, and means for rendering said first-named limit device ineffective.

9. In combination, a generator, a prime mover for said generator, control means for controlling the rate of delivery of energy to said prime mover, said control means including a member movable in accordance with the rate of delivery of the energy, means for moving said member to cause the energy to be delivered at different rates, two limit devices for limiting the movement of said movable member, means for moving one of said limit devices to vary the limit thereof, and means for rendering said last-mentioned limit device ineffective.

10. In combination with an alternating current distributing system, a generator, a prime mover for said generator, means for connecting said generator to said system, a governor responsive to the speed of said prime mover, means for admitting driving medium to said prime mover, an actuating connection between said governor and admitting means including an adjustable member, means responsive to the frequency difference between said generator and system for moving said member to bring the prime mover and generator to synchronous speed and including a releasable detent engaged with said member, means for limiting the movement of said member whereby to limit the maximum supply of driving medium to said prime mover, and means operated with said connecting means as the latter closes for releasing said detent so that the member is thereafter free to move independently of the position of said moving means.

11. In combination with an alternating current distributing system, a generator, a prime mover for said generator, means for connecting said generator to said system, a governor responsive to the speed of said prime mover, means for admitting driving medium to said prime mover, an actuating connection between said governor and admitting means including an adjustable member, first means for controlling the position of said member including devices for moving the same to synchronize the generator with said system, second means for controlling the position of said member to establish a maximum opening of said admitting means, and devices operated with said connecting means for mechanically disconnecting said first means and placing said member under the control of said second means when said connecting means is moved to circuit-closing position.

12. A combination as in claim 11, in which said synchronizing and disconnecting devices include elements operative when the connecting means is moved to circuit-closing position for maintaining the synchronizing devices in the prevailing position ready for immediately bringing the generator back to synchronous speed upon re-energization of said first means.

13. A combination as in claim 11, including means for moving the member to position for shutting said admitting means and in which said synchronizing and disconnecting devices include elements operative when the connecting means is moved to open position for restoring said first means mechanically to control of said member when the latter has been moved toward said shutting position.

14. In combination with an alternating current distributing system, a generator, a prime mover for said generator, means for connecting said generator to said system, a governor responsive to the speed of said prime mover, means for admitting driving medium to said prime mover, an actuating connection between said governor and admitting means including an adjustable member, first means for controlling the position of said member including devices for moving the same to synchronize the generator with said system, second means for controlling the position of said member to establish a greater opening of said admitting means for admitting more of said medium than is required for maintaining said generator at synchronous speed under the synchronizing conditions, and devices operated with said connecting means for mechanically disconnecting said first means and placing said member under the control of said second means when said connecting means is moved to circuit-closing position so that a greater supply of driving medium is admitted to said prime mover when the generator is being connected to the system whereby the generator will deliver current to said system.

15. In combination with an alternating current distributing system, a generator, means for connecting said generator to said system, a prime mover for said generator, means for admitting driving medium to said prime mover, a governor responsive to the speed of said prime mover, means controlled by said governor for regulating said admitting means, means actuated when the connecting means is operated for connecting said generator to said system and then active for producing a predetermined movement of said admitting means independently of the position of the governor so that an acceleration is given to the generator upon connection to the system and control means for restraining the regulation of said admitting means by said governor during said acceleration and being connected for permitting said regulation after the acceleration and while the generator continues to deliver power to said system.

16. In combination with an electrical distribution system, a generator, means for connecting said generator to said system, a prime mover for said generator, means for controlling the admission of driving medium to said prime mover including means for urging the same for increasing the supply of driving medium, a detent for restricting the supply-increasing control movement of the control means whereby to establish a predetermined electrical relation of the generator with the system, means responsive to said electrical relation for actuating said connecting means, and means for terminating the restriction of the control means by said detent so that the control means operates to effect a greater supply of driving medium while the generator is in condition for delivering power through the connecting means to said system.

17. In combination with an electrical distribution system, a generator, a prime mover for said generator, means for regulating the admission of driving medium to said prime mover, means operative to move said regulating means to increase the supply of driving medium to said prime mover, a detent operating upon the regulating means for restricting the rate of supply of driving medium to the prime mover so that the prime mover and generator are brought to and maintained at a speed at which the generator may be connected to the system, and means for terminating the restriction of the regulating means by the detent so that the regulating means will increase the supply of driving medium to the prime mover when the generator is in condition for delivering current to the system.

18. In combination with an electrical distribution system, a generator, a prime mover for said generator, means for regulating the admission of driving medium to said prime mover, means operative to move said regulating means to increase the supply of driving medium to said prime mover, a detent for restricting the rate of supply of driving medium to the prime mover so that the prime mover and generator are brought to and maintained at a speed at which the generator may be connected to the system, and control means for connecting the generator to the system and for releasing said detent, said control means being responsive to the electrical condition of the generator relative to the system for releasing the detent when the generator is in condition for delivering current to the system.

19. In combination with an electrical distribution system, a generator, means for connecting said generator to said system, a prime mover for said generator, means for controlling the admission of driving medium to said prime mover including means for urging the same for increasing the supply of driving medium, a detent for restricting the supply-increasing control movement of the control means, means for moving said detent and therewith said control means whereby to establish a predetermined electrical relation of the generator with the system, means responsive to said electrical relation for actuating said connecting means, and means for terminating the restriction of the control means by said detent so that the control means operates to effect a greater supply of driving medium while the generator is in condition for delivering power through the connecting means to said system.

20. In combination, an electric distribution system, an electric generator and a prime mover therefor, a governor for said prime mover including a member movable for determining the power input to the prime mover, a movable limit device for limiting the movement of said member during a time prior to the connection of said generator to said electrical system, and means responsive to the available supply of driving medium for the prime mover for moving said limit device.

21. In combination, an electric distribution system, an electric generator and a prime mover therefor, a governor for said prime mover including a member movable for determining the power input to the prime mover, means for limiting said member for predetermining an initial speed condition of the generator and including actuating means embodying a device responsive to the available supply of driving medium for the prime mover, and means responsive to the relative electrical condition of the system and the generator for terminating the action of said limiting means upon said member.

22. In combination, an electric distribution system, an electric generator and a prime mover therefor, a governor for said prime mover including a member movable for determining the power input to the prime mover, means for limiting said member for predetermining an initial speed condition of the generator, means for moving said limiting means in response to change of available supply of driving medium for the prime mover, means for moving said limiting means responsive to the speed of said generator, and means responsive to the relative electrical condition of the system and the generator for terminating the action of said limiting means upon said member.

23. In combination, an electrical distribution system; a generator and a prime mover therefor; a governor including means responsive to the speed of the prime mover, a member actuated from the responsive means for varying the supply of driving medium to the prime mover, and first means actuated from said movable member for compensating for the movement thereof; and second means also actuated from said movable member for controlling said responsive means to compensate for the movement of said first compensating means.

24. A combination as in claim 23, in which the governor includes an element moved directly by said responsive means, and a spring connection between said element and said member; and in which said second means includes a lever for pressing upon said element, and a spring connected to said lever and said first compensating means.

25. In a speed governing control system for a prime mover, a source of supply of driving medium for the prime mover, a first means actuated by the prime mover for determining a rate of supply from said source for driving the prime mover at a predetermined rate of speed, a second means actuated in accordance with the variation of the flow of driving medium delivered to said prime mover for changing the rate of speed as controlled by the said first means, a third means actuated in accordance with a varying flow of driving medium delivered to said prime mover and including a time delay device for effecting an adjustment of said first means to compensate for the change in the rate of speed procured by the said second means so that a substantially constant rate of speed is maintained throughout a varying flow of driving medium delivered to said prime mover.

26. In a speed governing control system for a prime mover, a source of supply of driving medium for the prime mover, a first means actuated by the prime mover for determining a rate of supply from said source for driving the prime mover at a predetermined speed, a second means actuated in accordance with the rate at which power is delivered by said prime mover for changing the rate of speed as controlled by the said first means, a third means including a time delay device for effecting an adjustment of said first means to compensate for the change in the rate of speed procured by the said second means so that substantially a predetermined speed is maintained regardless of variations of the rate at which power is delivered by said prime mover.

ERICK PEARSON.